United States Patent [19]

Schreck et al.

[11] Patent Number: 5,280,074
[45] Date of Patent: Jan. 18, 1994

[54] PROCESS FOR THE PREPARATION OF A POLYPROPYLENE MOLDING COMPOSITION

[75] Inventors: Michael Schreck, Frankfurt am Main; Andreas Winter, Kelkheim; Walter Spaleck, Liederbach; Hartmut Kondoch, Frankfurt am Main; Jurgen Rohrmann, Liederbach, all of Fed. Rep. of Germany

[73] Assignee: Hoechst AG, Frankfurt, Fed. Rep. of Germany

[21] Appl. No.: 960,248

[22] Filed: Oct. 13, 1992

Related U.S. Application Data

[63] Continuation of Ser. No. 630,151 Dec. 19, 1990, abandoned.

[30] Foreign Application Priority Data

Dec. 21, 1989 [DE] Fed. Rep. of Germany ....... 3942364

[51] Int. Cl.$^5$ .............................................. C08L 23/06
[52] U.S. Cl. .................................. 525/240; 525/247; 525/323
[58] Field of Search .................. 525/323, 240, 247; 526/126

[56] References Cited

U.S. PATENT DOCUMENTS 4,739,015  4/1988  Toyota et al. ................... 525/323
5,086,134  2/1992  Antberg et al. ................. 526/126

FOREIGN PATENT DOCUMENTS 302424  8/1987  European Pat. Off. .
3826075  1/1990  Fed. Rep. of Germany .

*Primary Examiner*—Joseph L. Schofer
*Assistant Examiner*—David Wu
*Attorney, Agent, or Firm*—Connolly and Hutz

[57] ABSTRACT

A propylene block copolymer having good flow properties and a very good low temperature impact strength is obtained in a high yield if a catalyst which consists of a chiral metallocene, containing a bridge, of the formula I

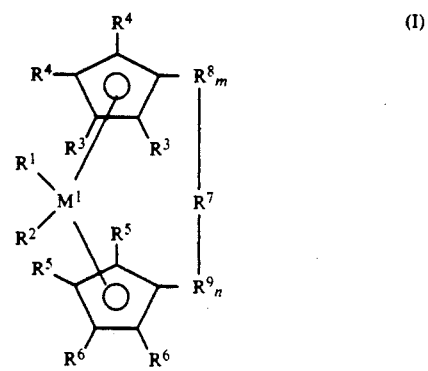

and an aluminoxane is used for the polymerization of propylene and the comonomers.

The polymerization is carried out in two stages, a crystalline propylene polymer in liquid monomers being prepared in the first stage and a copolymer in the gas phase being prepared in the second stage.

18 Claims, No Drawings

PROCESS FOR THE PREPARATION OF A POLYPROPYLENE MOLDING COMPOSITION

This application is a continuation of application Ser. No. 07/630,151 filed on Dec. 19, 1990, abandoned.

DESCRIPTION

The present invention relates to a process for the preparation of a polypropylene molding composition in which a predominantly crystalline propylene homo- or copolymer is produced in the first stage and a random copolymer of propylene with ethylene and if appropriate a second 1-olefin and a partly crystalline polymer of the second 1-olefin are produced in the second stage.

Isotactic polypropylene can be processed to shaped articles which have advantageous mechanical properties, above all a high hardness, rigidity and heat distortion point, even at higher temperatures. The good resistance to stress cracking also has an advantageous effect for many uses. In contrast, the high glass transition temperature of the amorphous constituents of the polypropylene of above 0° C. is a disadvantage. This causes a marked reduction in the impact strength and tear and flexural strength of objects produced from isotactic polypropylene as the temperature drops, especially at below 0° C.

It is therefore advantageous to add to isotactic PP a component which has a glass transition temperature below the use temperatures to be expected later, down to −40° C. Attempts are made to achieve this by addition of components with the lowest possible glass transition temperature, above all ethylene-propylene copolymers or polyethylene and combinations thereof with polypropylene being added. Such mixtures can be prepared by bringing the individual constituents together in roll mills, kneaders or extruders.

However, they are also formed by various methods of block copolymerization using Ziegler-Natta catalysts.

These processes of block copolymerization are particularly advantageous because the polymer mixture of improved impact strength and toughness is obtained in powder form and under certain circumstances granulation can be avoided before its further processing.

It is known that a polymer of improved impact strength, especially at low temperatures, can be prepared in a multi-stage polymerization with the aid of Ziegler-Natta catalysts, the hardness of the polypropylene being largely retained. Polymers of this type are an intimate mixture of the various components and are generally called block copolymers.

The preparation of such block copolymers with the aid of Ziegler catalysts based on an $MgCl_2$ support is known (compare U.S. Pat. No. 4,576,994).

The object is to produce a copolymer in the second stage, in which copolymer the glass transition range of the noncrystalline components should be as low as possible and should be within a narrow range, since an excellent impact strength can then be expected even at low temperatures.

It has now been found that block copolymers having excellent flow properties and in which the amorphous components have glass transition temperatures only at very low temperatures and within a narrow temperature range can be prepared particularly advantageously if a metallocene catalyst system is used for their preparation.

The invention thus relates to a process for the preparation of a polypropylene molding composition consisting of (1) 20 to 99% by weight of a crystalline polymer which consists to the extent of at least 95% by weight of polymerized propylene and (2) 1 to 80% by weight of a non-crystalline ethylene-propylene copolymer having an ethylene content of 20 to 90% by weight, in which first the polymer (1) is prepared in one or more stages in liquid propylene over a residence time of 15 to 400 minutes under a pressure of 5 to 100 bar and at a temperature of 0 to 100° C., and the polymer (2) is prepared in a second stage over a residence time of 10 to 180 minutes, under a pressure of 5 to 100 bar and at a temperature of 0 to 100° C. in the presence of ethylene in the gas phase, in the presence of a catalyst which consists of a transition metal compound and an organoaluminum compound, which comprises carrying out the polymerization in the second stage in the gas phase, and using a transition metal compound which is a metallocene of the formula I

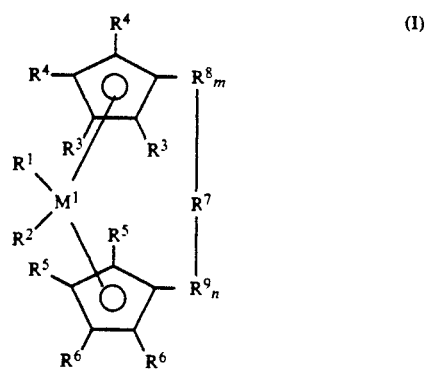

in which $M^1$ is a metal of group IVb, Vb or VIb of the periodic table, $R^1$ and $R^2$ are identical or different and are a hydrogen atom, a $C_1$-$C_{10}$-alkyl group, a $C_1$-$C_{10}$-alkoxy group, a $C_6$-$C_{10}$-aryl group, a $C_6$-$C_{10}$-aryloxy group, a $C_2$-$C_{10}$-alkenyl group, a $C_7$-$C_{40}$-arylalkyl group, a $C_7$-$C_{40}$-alkylaryl group, a $C_8$-$C_{40}$-arylalkenyl group or a halogen atom, $R^3$, $R^4$, $R^5$ and $R^6$ are identical or different and are a hydrogen atom, a halogen atom, a $C_1$-$C_{10}$-alkyl group, $-NR_2^{10}$, $-SR^{10}$, $-OSiR_3^{10}$, $-SiR_3^{10}$ or $PR_2^{10}$, in which $R_{10}$ is a halogen atom or a $C_1$-$C_{10}$-alkyl group, or in each case two adjacent $R^3$, $R^4$, $R^5$ or $R^6$ form a ring with the carbon atoms joining them,

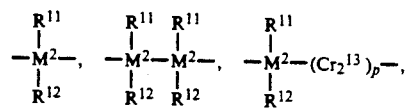

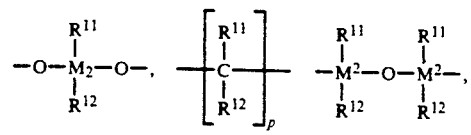

-continued

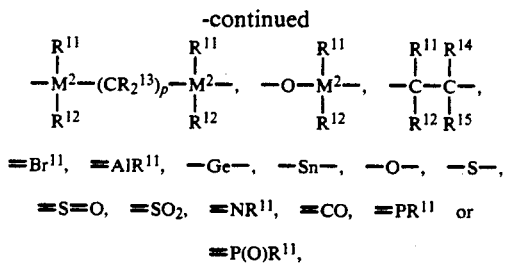

$=BR^{11}$, $=AlR^{11}$, $-Ge-$, $-Sn-$, $-O-$, $-S-$, $=S=O$, $=SO_2$, $=NR^{11}$, $=CO$, $=PR^{11}$ or $=P(O)R^{11}$, in which $R^{11}$, $R^{12}$, $R^{13}$, $R^{14}$ and $R^{15}$ are identical or different and are a hydrogen atom, a halogen atom, a $C_1$-$C_{10}$-alkyl group, a $C_1$-$C_{10}$-fluoroalkyl group, a $C_6$-$C_{10}$-aryl group, a $C_6$-$C_{10}$-fluoroaryl group, a $C_1$-$C_{10}$-alkoxy group, a $C_2$-$C_{10}$-alkenyl group, a $C_7$-$C_{40}$-arylalkyl group, a $C_8$-$C_{40}$-arylalkenyl group or a $C_7$-$C_{40}$-alkylaryl group, or $R^{11}$ and $R^{12}$ and $R^{13}$ form a ring, in each case with the atoms joining them, $M^2$ is silicon, germanium or tin, p is 1, 2 or 3, $R^8$ and $R^9$ are identical or different and are a group $=CR^{11}R^{12}$, in which $R^{11}$ and $R^{12}$ have the above-mentioned meaning, and m and n are identical or different and are zero, 1 or 2, m+n being zero, 1 or 2, and an organoaluminum compound which is an aluminoxane of the formula II

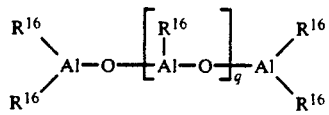

for the linear type and/or of the formula III

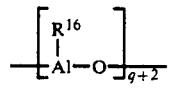

for the cyclic type, in which $R^{16}$ is a $C_1$-$C_6$-alkyl group and q is an integer from 2 to 50.

The catalyst to be used for the process according to the invention consists of a metallocene compound of the formula I and an aluminoxane. In formula I

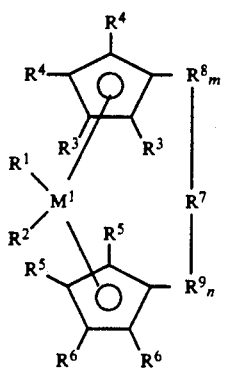

$M^1$ is a metal from group IVb, Vb or VIb of the periodic table, for example titanium, zirconium, hafnium, vanadium, niobium, tantalum, chromium, molybdenum or tungsten, preferably zirconium or hafnium.

$R^1$ and $R^2$ are identical or different and are a hydrogen atom, a $C_1$-$C_{10}$-, preferably $C_1$-$C_3$-alkyl group, a $C_1$-$C_{10}$-, preferably $C_1$-$C_3$-alkoxy group, a $C_6$-$C_{10}$-, preferably $C_6$-$C_8$-aryl group, a $C_6$-$C_{10}$-, preferably $C_6$-$C_8$-aryloxy group, a $C_2$-$C_{10}$-, preferably $C_2$-$C_4$-alkenyl group, a $C_7$-$C_{40}$-, preferably $C_7$-$C_{10}$-arylalkyl group, a $C_7$-$C_{40}$-, preferably $C_7$-$C_{12}$-alkylaryl group, a $C_8$-$C_{40}$, preferably $C_8$-$C_{12}$-arylalkenyl group or a halogen atom, preferably chlorine.

$R^3$, $R^4$, $R^5$ and $R^6$ are identical or different, preferably different, and are a hydrogen atom, a halogen atom, preferably a fluorine, chlorine or bromine atom, a $C_1$-$C_{10}$-, preferably $C_1$-$C_3$-alkyl group, $-NR^{10}$, $-SR^{10}$, $-OSiR_3^{10}$, $-SiR_3^{10}$ or $PR_2^{10}$, in which $R_{10}$ is a halogen atom, preferably a chlorine atom, or a $C_1$-$C_{10}$-, preferably $C_1$-$C_3$-alkyl group, or in each case two adjacent $R^3$, $R^4$, $R^5$ or $R^6$ form a ring with the carbon atoms joining them.

$R^7$ is

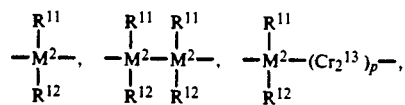

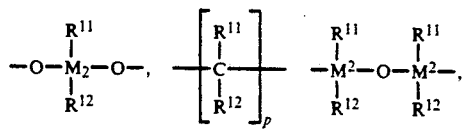

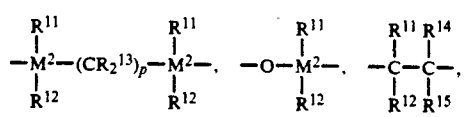

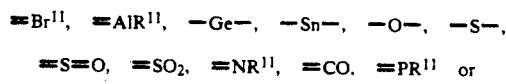

$=BR^{11}$, $=AlR^{11}$, $-Ge-$, $-Sn-$, $-O-$, $-S-$, $=S=O$, $=SO_2$, $=NR^{11}$, $=CO$, $=PR^{11}$ or $=P(O)R^{11}$, $R^{11}$, $R^{12}$, $R^{13}$, $R^{14}$ and $R^{15}$ are identical or different and are a hydrogen atom, a halogen atom, a $C_1$-$C_{10}$-alkyl group, preferably a $C_1$-$C_4$-alkyl group, in particular a methyl group, a $C_1$-$C_{10}$-fluoroalkyl group, preferably a $CF_3$ group, a $C_6$-$C_{10}$-, preferably $C_6$-$C_8$-aryl group, a $C_6$-$C_{10}$-fluoroaryl group, preferably a pentafluorophenyl group, a $C_1$-$C_{10}$-, preferably $C_1$-$C_4$-alkoxy group, in particular a methoxy group, a $C_2$-$C_{10}$-, preferably $C_2$-$C_4$-alkenyl group, a $C_7$-$C_{40}$-, preferably $C_7$-$C_{10}$-arylalkyl group, a $C_8$-$C_{40}$-, preferably preferably $C_8$-$C_{12}$-arylalkenyl group or a $C_7$-$C_{40}$-, preferably $C_7$-$C_{12}$-alkylaryl group, or $R^{11}$ and $R^{12}$ or $R^{11}$ and $R^{13}$ form a ring, in each case together with the atoms joining them.

$M^2$ is Si, Ge or Sn and p is 1, 2 or 3, $R^7$ is preferably $=SiR^{11}R^{12}$, $=GeR^{11}R^{12}$, $-S-$, $=S=O$ or $=PR^{11}$, $R^8$ and $R^9$ are identical or different and are a group $=CR^{11}R^{12}$, in which $R^{11}$ and $R^{12}$ have the above-mentioned meaning, and m and n are identical or different and denote zero, 1 or 2, m+n being zero, 1 or 2. Preferably, m and n are zero or 1.

The metallocenes described above can be prepared in accordance with the following equation:

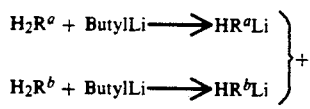

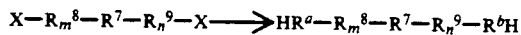

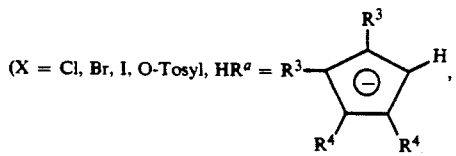

(X = Cl, Br, I, O-Tosyl, HR$^a$ =

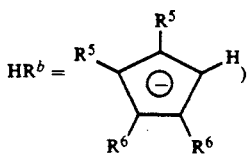
,

HR$^b$ = 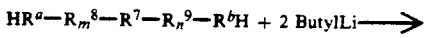)

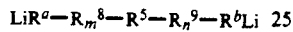

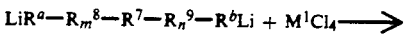

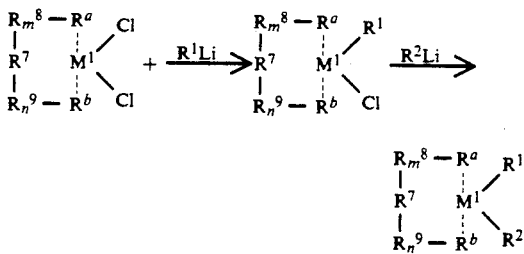

The metallocene compounds which are particularly preferably employed are rac-ethylenebisindenylhafnium di-chloride rac-dimethylsilylbisindenylhafnium dichloride, rac-phenyl(methyl)silylbisindenylhafnium dichloride and in particular rac-dimentylsilylbisindenylzirconium dichloride.

The activator is an aluminoxane of the formula (II)

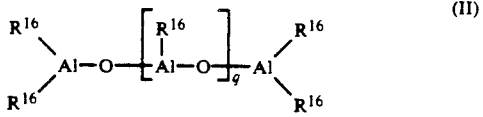 (II)

for the linear type and/or of the formula (III)

 (III)

for the cyclic type. In these formulae, $R^{16}$ is a $C_1$-$C_6$-alkyl group, preferably methyl, ethyl or isobutyl, in particular methyl, and q is an integer from 2 to 50, preferably 10 to 40. However, the precise structure of the aluminoxane is not certain and the formulae II and III are therefore only approximation formulae.

The aluminoxane can be prepared in various ways.

One possibility is careful addition of water to a dilute solution of an aluminum trialkyl byF introducing in each case small portions of the solution of the aluminum trialkyl and the water into an initial larger amount of an inert solvent and in each case awaiting the end of the evolution of gas in between additions.

In another process, finely powdered copper sulfate pentahydrate is suspended in toluene in a glass flask and aluminum trialkyl is added under an inert gas at about $-20°$ C. in an amount such that about 1 Mol of CuSo$_4$ù5H$_2$O is available for every 4 Al atoms. After slow hydrolysis with alkane being split off, the reaction mixture is left to stand at room temperature for 24 to 48 hours, during which it must be cooled if appropriate, so that the temperature does not rise above 30° C. The aluminoxane dissolved in the toluene is then filtered off from the copper sulfate and the solution is concentrated in vacuo.

It is assumed that in this preparation process the low molecular weight aluminoxanes undergo condensation to higher oligomers, aluminum trialkyl being split off.

Aluminoxanes are furthermore obtained if aluminum trialkyl, preferably aluminum trimethyl, dissolved in an inert aliphatic or aromatic solvent, preferably heptane or toluene, iB reacted with aluminum salts containing water of crystallization, preferably aluminum sulfate, at a temperature of $-20$ to $100°$ C. The volume ratio between the solvent and the aluminum alkyl used in this reaction is 1:1 to 50:1—preferably 5:1—and the reaction time, which can be checked by measuring the splitting off of the alkane, is 1 to 200 hours—preferably 10 to 40 hours.

Of the aluminum salts containing water of crystallization, those which have a high content of water of crystallization are used in particular. Aluminum sulfate hydrate, above all the compounds Al$_2$(SO$_4$)$_3$ù16H$_2$O and Al$_2$(SO$_4$)$_3$ù18H$_2$O with the particularly high water of crystallization content of 16 and 18 mol of H$_2$O/Mol of Al$_2$(SO$_4$)$_3$ respectively, is particularly preferred.

Another variant for the preparation of aluminoxanes comprises dissolving aluminum trialkyl, preferably aluminum trimethyl, in the suspending agent which has been initially introduced into the polymerization kettle, preferably in the liquid monomer or heptane or toluene, and then reacting the aluminum compound with water.

In addition to the processes described above for the preparation of aluminoxanes, there are others which can be used.

It is possible for the metallocene to be preactivated with an aluminoxane of the formula (II) and/or (III) before use in the polymerization reaction. This significantly increases the polymerization activity.

The preactivation of the transition metal compound is carried out in solution. In this preactivation, the metallocene is preferably dissolved in a solution of the aluminoxane in an inert hydrocarbon. An aliphatic or aromatic hydrocarbon is a suitable inert hydrocarbon. Toluene is preferably used.

The concentration of the aluminoxane in the solution is in the range from about 1% by weight up to the saturation limit, preferably from 5 to 30% by weight, in each case based on the total solution. The metallocene can be employed in the same concentration, but it is preferably employed in an amount of $10^{-4}-1$ mol per mol of aluminoxane. The preactivation time is 5 minutes to 60 hours, preferably 10 to 60 minutes. The preactivation is carried out in a temperature of $-78°$ C. to $100°$ C., preferably 0 to 70° C.

A significantly longer preactivation time is possible and may be entirely appropriate for storage purposes.

The homopolymerization is carried out in a known manner in solution, in suspension or in the gaB phase, continuously or discontinuously in one or more stages at a temperature of 0 to 100° C., preferably 40 to 85° C. The pressure is 5 to 100 bar. Polymerization in the pressure range of 5 to 49 bar, which is of particular industrial interest, is preferred.

The metallocene compound is used in this polymerization in a concentration, based on the transition metal, of $10^{-3}$ to $10^{-7}$, preferably $10^{-4}$ to $10^{-6}$ mol of transition metal per $dm^3$ of solvent or per $dm^3$ of reactor volume. The aluminoxane is used in a concentration of $10^{-4}$ to $10^{-1}$ mol, preferably $10^{-3}$ to $10^{-2}$ mol per $dm^3$ of solvent or per $dm^3$ of reactor volume. On principle, however, higher concentrations are also possible.

The monomer to be polymerized is preferably employed as the solvent or suspending agent. The molecular weight of the polymer can be regulated in a known manner; hydrogen is preferably used for this. The polymerization is of any desired duration, since the catalyst system to be used according to the invention displays only a slight time-dependent drop in polymerization activity.

The process according to the invention is carried out in two stages, a highly crystalline polypropylene or poly-propylene modified with a small amount of another 1-olefin as a comonomer being prepared in the first stage and an ethylene-propylene copolymer and a crystalline polymer formed predominantly from ethylene being formed in the second stage.

The two polymers formed in the second reaction stage can be modified by a further 1-olefin.

The polymerization in the first reaction stage is preferably carried out by pumping liquid propylene, a solution of the solid catalyst portion in a solvent and the other liquid catalyst constituents into. a suitable reaction vessel. This reaction vessel can be an autoclave, a customary reaction kettle or a tube reactor in loop form, adequate mixing being ensured in the customary manner by incorporated stirrers or circulating pumps.

The heat of reaction is removed by jacket cooling, by internal cooling incorporated in the vessels or by vapor cooling.

The liquid propylene itself, which serves both as the monomer and as the suspending agent, can contain varying amounts of inert, low-boiling dissolved constituents, such as, for example, propane or nitrogen.

A reaction temperature of 0 to 100° C., preferably one of 40 to 85° C., is maintained in the first reaction stage.

The pressure is 5 to 100 bar, preferably 5 to 49 bar.

The desired molecular weight of the copolymer can be established by addition of hydrogen.

The amount of polymer prepared in the first stage is 20 to 99% by weight, preferably 40 to 95% by weight, in particular 60 to 95% by weight, based on the entire solid polymer formed in the process.

If a polypropylene modified with small amounts of another 1-olefin as a comonomer is to be prepared in the first stage, the comonomer is metered in like the other starting substances. Possible other 1-olefins are ethylene and monounsaturated hydrocarbons having 4 to 10 carbon atoms, preferably ethylene and butene, in particular ethylene. The concentration of the ethylene or 1-olefin in the liquid propylene in this case is 0 to 20 mol %. The polymer from the first stage consists of polymerized propylene to the extent of at least 95% by weight.

The polymer suspension formed in the first stage, which essentially contains the predominantly crystalline isotactic polypropylene, modified with small amounts of a 1-olefin if appropriate, the active catalyst constituents, liquid propylene, certain amounts of hydrogen and if appropriate inert contents, is now transferred to the second reaction stage.

This can be effected by first removing excess monomer or monomer mixture from the polymer by filtration, distillation or rapid evaporation (flashing). A combination of these separation methods is also conceivable. The degree of removal of the monomer can vary, the monomer being removed to at least a residual monomer pressure which is below the boiling point of the monomer or of the monomer mixture, so that it is ensured that no further monomer content is present in condensed (liquefied) form.

Ethylene and/or a propylene/ethylene mixture and if appropriate another 1-olefin having 4 to 10 carbon atoms is now introduced into the reactor until the required reactor pressure is reached. This is chosen so that it is below the equilibrium boiling pressure of the monomer mixture at the reactor temperature established. The equilibrium pressure can be obtained from the tables.

A desired composition of the monomer is maintained throughout the entire duration of the polymerization in the second stage by permanent introduction of ethylene and/or a propylene/ethylene mixture Buch as is obtained after working up of the reaction product.

The pressure in the second stage in this procedure is 5 to 100 bar, preferably 5 to 49 bar.

The residence times in the individual reaction stages are adjusted so that they are 15 to 400 minutes, preferably 20 to 180 minutes, in the first stage and 10 to 180 minutes, preferably 15 to 90 minutes, in the second stage.

It is also possible for the activator additionally to be topped up in the second stage. This is advantageous above all if the polymerization in the first stage is carried out at a low molar ratio of activator to metallocene or at a low activator concentration.

If necessary, additional hydrogen is also fed into the second stage for suitable regulation of the molecular weight of the polymer prepared in that stage.

The temperature in the second polymerization stage is 0 to 100° C., preferably 40 to 85° C.

After the second stage has been carried out, the polymer formed is worked up. This can be effected by letting down the resulting mixture of polymer and monomer to atmospheric pressure in one or more stages and recycling the residual monomer to the circulation.

However, it is also possible to introduce ethylene and if appropriate another monomer into the suspension after the first reaction stage, without removing excess propylene, until the composition and thermodynamic properties of the liquid phase and gas phase are identical. The monomer mixture is then in a supercritical gas state and can no longer be liquefied by applying an external pressure. The composition of the mixture needed to achieve the super-critical state depends on the reaction temperature and varies from 0 to 85% of ethylene, and is, for example, about 63 mol % of ethylene at about 50° C. and about 55 bar, about 38 mol % of ethylene at about 68° C. and about 52 bar and about 12 mol % of ethylene at about 85° C. and about 49 bar. The relevant data for the particular temperature can moreover be found in the appropriate tables.

The polymerization is advantageously not carried out close to the critical pressure of the monomer mixture, but ethylene is added in an amount such that in the second stage the reactor is operated at 3 to 50 bar, preferably 3 to 25 bar above the critical pressure which applies to the reaction temperature.

A sufficiently high constant pressure is maintained throughout the entire duration of the polymerization in the second stage by permanent introduction of ethylene and/or a propylene/ethylene mixture such as is obtained after working up of the reaction product.

The pressure in the second stage in this procedure is 45 to 100 bar, preferably 49 to 65 bar.

The residence times in the individual reaction stages are adjusted so that they are 15 to 400 minutes, preferably 20 to 180 minutes, in the first stage and 10 to 180 minutes, preferably 15 to 90 minutes, in the second stage.

It is also possible for the activator additionally to be topped up in the second stage. This is advantageous above all it the polymerization in the first stage is carried out at a low molar ratio of activator to metallocene or at a low activator concentration.

If necessary, additional hydrogen is also fed in during the second stage for suitable regulation of the molecular weight of the polymers prepared in that stage.

If the first stage is not carried out in a reactor which is completely filled with liquid, there is also the possibility of reducing the hydrogen content of the suspension before the start of the second stage by removal of gas mixture from the gas phase.

The temperature in the second polymerization stage is 10 to 100° C., preferably 40 to 80° C.

After the second stage has been carried out, the polymer formed is worked up. This can be effected by letting down the resulting mixture of polymer and monomer to atmospheric pressure in one or more stages and if appropriate recycling the residual monomer to the circulation.

However, working up can also be effected by filtration, decantation or centrifugation in pressure-resistant units suitable for this purpose, for example in pressure filters, sedimentation towers, centrifuges or decanters.

In addition to an adequate hardness and good flow properties, the block copolymer prepared by the process according to the invention has a good impact strength over a wide temperature range, but above all at low temperatures of −40° C. and −60° C.

These polymers are by far superior in their low temperature impact strength to the polymers prepared to date using catalyst systems according to the prior art, as can be seen from the comparison with the homopolymers prepared using metallocene catalysts.

Compared with the block copolymers prepared using catalysts based on $MgCl_2$, the products prepared according to the invention are distinguished by a high catalybt yield, a solidification of the amorphous phase which takes place at a very low temperature and within a very narrow temperature range and therefore a very good low temperature impact strength.

The block copolymer obtained according to the invention is provided with the customary additives (stabilizers, lubricants, fillers, pigments and the like) for further processing. It can be used directly for the production of shaped articles of plastic without further pretreatment in extruders or kneaders.

However, it can also be converted into granule form in extruders or kneaders. This additional processing step may lead to an improvement in the mechanical properties of the shaped articles produced.

The properties of the polymers prepared according to the following examples were determined specifically by the following methods:

The melt flow index was measured in accordance with DIN 53 735 and has been stated in g/10 minutes.

The viscosity number VN of the polymers was determined on 0.1% strength by weight solutions in decahydronaphthalene (isomer mixture) at 135° C. in a capillary viscometer and has been stated in $cm^3/g$.

The ball indentation hardnesses were measured in accordance with DIN 53 456 on presbed sheets which had been annealed at 100 or 120° C. under $N_2$ for 3 hours, cooled in the course of 3 hours and stored in a climatically controlled chamber at 23° C. and 50% relative atmospheric humidity for 24 hours for temperature adjustment.

The flexural impact test at −40° C. and −60° C. on a standard small bar having a V notch (flank angle 45°, notch depth 1.3 mm, notch radius 1 mm) was used to determine the mechanical properties at low temperatures. The test specimens were taken from pressed sheets which had been stored at 23° C. and 50% relative atmospheric humidity for 24 hours after production.

The ethylene content was determined by IR spectroscopy on 0.1 mm thick films pressed at 180° C., the absorption bands at the wavelengths 13.65 and 13.9 lm being used for the evaluation.

The content of non-crystalline ethylene-propylene copolymer was determined by recrystallization of the block copolymers from a gasoline mixture (boiling range 140 to 170° C.) and precipitation of the contents soluble therein at 25° C. using acetone.

EXAMPLE 1

A dry kettle of 16 $dm^3$ capacity was flushed with nitrogen and filled with 10 $dm^3$ of liquid propylene. 44 $cm^3$ of a toluene solution of methylaluminoxane (=MAO, corresponding to 64 mmol of Al, average degree of oligomerization n=20) were then added and the mixture was stirred at 30° C. for 15 minutes. In parallel with this, 34.5 mg (0.064 mmol) of rac-dimethylsilylbisindenylhafnium dichloride were dissolved in 23 $cm^3$ of MAO solution (=34 mmol of Al) and were preactivated by being left to stand for 15 minutes.

The solution was then added to the kettle. The polymerization system was heated up to a temperature of 70° C. and then kept at this temperature for 80 minutes. Towards the end of the reaction time, excess monomer was evaporated off until the internal pressure in the kettle had fallen to 20 bar at an internal temperature of 70° C. and a liquid phase was no longer present. A gaseous mixture of 26% of ethylene and 74% of propylene was now passed in and the reactor pressure was adjusted to 28.2 bar. This pressure was maintained during the remaining 15 minutes of reaction time by topping up with ethylene. 0.44 kg of block copolymer was obtained. The polymer had a VN of 113. 5.6% by weight of the polymer was formed by polymerization of ethylene. 76% of crystallizable contents, based on the total polymer, having an ethylene content of 0.4% by weight and a VN of 110 was obtained by recrystallization from the gasoline mixture. 24%, based on the block copolymer, of a rubbery composition having an ethylene content of 22% by weight and a VN of 123 was obtained from the mother liquor by precipitation with acetone. In the enthalpy curve obtained from the differential thermal analysis (−180 to 200° C., heating rate 2 K/minute), two glass transitions were to be observed below the temperature zero point in the temperature ranges from −60 to −48° C. and from −31 to −19° C. Melting of the polymer likewibe took place in two sections at 133 and 154° C. The polymer had a melt flow index 230/2.16 of 51 g/10 minutes, a notched impact strength at −40° C. of 6.4 mJ/mm$^2$ and a notched impact strength at −60° C. of 2.9 mJ/mm$^2$.

EXAMPLE 2

A dry kettle of 70 dm$^3$ capacity was flushed with nitrogen and filled with 40 dm$^3$ of liquid propylene. 174 cm$^3$ of a toluene solution of methylaluminoxane (=MAO, corresponding to 256 mmol of Al, average degree of oligomerization n=20) were then added and the mixture was stirred at 30° C. for 15 minutes. In parallel with this, 71.9 mg (0.134 mmol) of rac-dimethylsilylbisindenylhafnium dichloride were dissolved in 90 cm$^3$ of MAO solution (=132 mmol of Al) and preactived by being left to stand for 15 minutes. The solution was then added to the kettle. The polymerization system was heated up to a temperature of 70° C. and then kept at this temperature for 60 minutes. After the temperature had fallen to 60° C., ethylene was passed into the suspension until the pressure at which the monomer mixture boiled had risen to 55 bar. This pressure was maintained throughout the remaining 15 minutes of reaction time by topping up with ethylene. 1.65 kg of block copolymer were obtained. The polymer had a VN of 194. 10.2% by weight of the polymer was formed by polymerization of ethylene. 78% of crystallizable contents, based on the total polymer, having an ethylene content of 0.5% by weight and a VN of 200 was obtained by recrystallization from the gasoline mixture. 22%, based on the block copolymer, of a rubbery composition having an ethylene content of 45% by weight and a VN of 172 was obtained from the mother liquor by precipitation with acetone.

In the enthalpy curve obtained from the differential thermal analysis (−180 to 200° C., heating rate 2 K/minute), two glass transitions were to be observed below the temperature zero point in the temperature ranges from −58 to −45° C. and from −29 to −17° C. Melting of the polymer likewise took place in two sections at 131 and 153° C. The polymer had a melt flow index 230/2.16 of 5.5 g/10 minutes, a notched impact strength at −40° C. of 7.5 mJ/mm$^2$ and a notched impact strength at −60° C. of 3.8 mJ/mm$^2$.

EXAMPLE 3

A dry kettle of 70 dm$^3$ capacity was flushed with nitrogen and filled with 40 dm$^3$ of liquid propylene. 174 cm$^3$ of a toluene solution of methylaluminoxane (=MAO, corresponding to 256 mmol of Al, average degree of oligomerization n=20) were then added and the mixture was stirred at 30° C. for 15 minutes. In parallel with this, 71.9 mg (0.134 mmol) of rac-dimethylsilylbisindenylhafnium dichloride were dissolved in 90 cm$^3$ of MAO solution (=132 mmol of Al) and were preactivated by being left to stand for 15 minutes.

The solution was then added to the kettle. The polymerization system was heated up to a temperature of 70° C. and then kept at this temperature for 60 minutes. After the temperature had fallen to 65° C., ethylene was passed into the suspension until the pressure at which the monomer mixture boiled had risen to 56 bar. This pressure was maintained throughout the remaining 15 minutes of reaction time by topping up with ethylene. 1.64 kg of block copolymer were obtained. The polymer had a VN of 205. 10.1% by weight of the polymer were formed by polymerization of ethylene. 76% of crystallizable contents, based on the total polymer, having an ethylene content of 0.6% by weight and a VN of 210 was obtained by recrystallization of the gasoline mixture. 24%, based on the block copolymer, of a rubbery composition having an ethylene content of 40.2% by weight and a VN of 189 was obtained from the mother liquor by precipitation with acetone. In the enthalpy curve obtained from the differential thermal analysis (−180 to 200° C., heating rate 2 K/minute), two glass transitions were to be observed below the temperature zero point in the temperature ranges from −60 to −49° C. and from −30 to −17° C. Melting of the polymer likewise took place in two sections at 133 and 56° C. The polymer had a melt flow index 230/2.16 of 4.3 g/10 minutes, a notched impact strength at −40° C. of 9. 1 mJ/mm$^2$ and a notched impact strength at −60° C. of 3.4 mJ/mm$^2$.

EXAMPLE 4

A dry kettle of 70 dm$^3$ capacity was flushed with nitrogen and filled with 40 dm$^3$ of liquid propylene. 174 cm$^3$ of a toluene solution of methylaluminoxane (=MAO, corresponding to 256 mmol of Al, average degree of oligomerization n=20) were then added and the mixture wall stirred at 30° C. for 15 minutes. In parallel with this, 71.1 mg (0.133 mmol) of rac-dimethylsilylbisindenylhafnium dichloride were dissolved in 90 cm$^3$ of MAO solution (=132 mmol of Al) and were preactivated by being left to stand for 15 minutes. The solution was then added to the kettle. The polymerization system was heated up to a temperature of 70° C. and then kept at this temperature for 60 minutes. Ethylene was passed into the suspension until the pressure at which the monomer mixture boiled had risen to 55 bar. This pressure was maintained throughout the remaining 15 minutes of reaction time by topping up with ethylene. 2.38 kg of block copolymer were obtained. The polymer had a VN of 204. 11.2% by weight of the polymer was formed by polymerization of ethylene. 72% of crystallizable contents, based on the total polymer, having an ethylene content of 0.5% by weight and a VN of 195 was obtained by recrystallization from the gasoline mixture. 28%, based on the block copolymer, of a rubbery composition having an ethylene content of 39% by weight and a VN of 227 was obtained from the mother liquor by precipitation with acetone. In the enthalpy curve obtained from the differential thermal analysis (−180 to 200° C., heating rate 2 K/minute), two glass transitions were to be observed below the temperature zero point in the temperature ranges from −60 to −49° C. and from −28 to −18° C. Melting of the polymer likewise took place in two sections at 133 and 156° C. The polymer had a melt flow index 230/2.16 of 4.1 g/10 minutes, a notched impact strength at −40° C. of 10.3 mJ/mm$^2$ and a notched impact strength at −60° C. of 4.4 mJ/mm$^2$.

EXAMPLE 5

A dry kettle of 70 dm$^3$ capacity was flushed with nitrogen and filled with 40 dm$^3$ of liquid propylene. 174 cm$^3$ of a toluene solution of methylaluminoxane (=MAO, corresponding to 256 mmol of Al, average degree of oligomerization n=20) were then added and the mixture was stirred at 30° C. for 15 minutes. In parallel with this, 64.8 mg (0.121 mmol) of rac-dimethylsilylbisindenylhafnium dichloride were dissolved in 90 cm³ of MAO solution (=132 mmol of Al) and were preactivated by being left to stand for 15 minutes. The solution was then added to the kettle. The polymerization system was heated up to a temperature of 70° C. and then kept at this temperature for 60 minutes. Ethylene was passed into the suspension until the pressure at which the monomer mixture boiled had risen to 55 bar. This pressure was maintained throughout the remaining 25 minutes of reaction time by topping up with ethylene. 1.4 kg of block copolymer were obtained. The polymer had a VN of 185. 15.8% by weight of the polymer were formed by polymerization of ethylene. 57% of crystallizable contents, based on the total polymer, having an ethylene content of 0.4% by weight and a VN of 197 was obtained by recrystallization from the gasoline mixture. 43% based on the block copolymer, of a rubbery composition having an ethylene content of 36% by weight and a VN of 169 was obtained from the mother liquor by precipitation with acetone. In the enthalpy curve obtained from the differential thermal analysis (−180 to 200° C., heating rate 2 K/minute), two glass transitions were to be observed below the temperature zero point in the temperature ranges from −59 to −45° C. and from −31 to −20° C. Melting of the polymer likewise took place in two sections at 129 and 150° C. The polymer had a melt flow index 230/2.16 of 6.2 g/10 minutes, a notched impact strength at −40° C. of 7.7 mJ/mm² and a notched impact strength at −60° C. of 2.9 mJ/mm².

EXAMPLE 6

A dry kettle of 70 dm³ capacity was flushed with nitrogen and filled with 40 dm³ of liquid propylene. 174 cm³ of a toluene solution of methylaluminoxane (=MAO, corresponding to 256 mmol of Al, average degree of oligomerization n=20) were then added and the mixture was stirred at 30° C. for 15 minutes. In parallel with this, 65.2 mg (0.122 mmol) of rac-dimethylsilylbisindenylhafnium dichloride were dissolved in 90 cm³ of MAO solution (=132 mmol of Al) and were preactivated by being left to stand for 15 minutes. The solution was then added to the kettle. The polymerization system was heated up to a temperature of 70° C. and then kept at this temperature for 60 minutes. Ethylene was passed into the suspension until the pressure at which the monomer mixture boiled had risen to 55 bar. This pressure was maintained throughout the remaining 35 minutes of reaction time by topping up with ethylene. 1.9 kg of block copolymer were obtained. The polymer had a VN of 184. 18.3% by weight of the polymer was formed by polymerization of ethylene. 49% of crystallizable contents, based on the total polymer, having an ethylene content of 0.6 by weight and a VN of 198 was obtained by recrystallization from the gasoline mixture. 51%, based on the block copolymer, of a rubbery composition having an ethylene content of 35% by weight and a VN of 171 was obtained from the mother liquor by precipitation with acetone. In the enthalpy curve obtained from the differential thermal analysis (−180 to 200° C., heating rate 2 K/minute), two glass transitions were to be observed below the temperature zero point in the temperature ranges from −61 to −50° C. and from −33 to −25° C. Melting of the polymer likewise took place in two sections at 136 and 158° C. The polymer had a melt flow index 230/2.16 of 3.3 g/10 minutes, a notched impact strength at −40° C. of 7.9 mJ/mm² and a notched impact strength at −60° C. of 2.9 mJ/mm².

COMPARISON EXAMPLE A

A dry kettle of 16 dm³ capacity was flushed with nitrogen and filled with 10 dm³ of liquid propylene. 43 cm³ of a toluene solution of methylaluminoxane (=MAO, corresponding to 68 mmol of Al, average degree of oligomerization n=20) were then added and the mixture was stirred at 30° C. for 15 minutes. In parallel, with this, 42.6 mg (0.079 mmol) of rac-dimethylsilylbisindenylhafnium dichloride were dissolved in 21.4 cm³ of MAO solution (=34 mmol of Al) and were preactivated by being left to stand for 15 minutes. The solution was then added to the kettle. The polymerization system was heated up to a temperature of 70° C. and kept at this temperature for 60 minutes. 2.15 kg of polymer having a VN 173 were obtained. 99.7% by weight of crystallizable contents, babed on the total polymer, were obtained by recrystallization from the gasoline mixture. 0.3% by weight, based on the polymer, of a tacky mass was obtained from the mother liquor by precipitation with acetone. In the enthalpy curve obtained from the differential thermal analysis (−180 to 2000° C., heating rate 2 K/minute), no glass transition was to be observed below the temperature zero point. Melting of the polymer took place at 1590° C. The polymer had a melt flow index 230/2.16 of 17 g/10 minutes, a notched impact strength at −40° C. of 1.6 mJ/mm² and a notched impact strength at −60° C. of 1.3 mJ/mm².

COMPARISON EXAMPLE B

Preparation of a solid titanium catalyst component 9.52 g (100 mmol) of anhydrous magnesium chloride, 50 cm³ of decane and 46.8 cm³ (300 mmol) of 2-ethylhexyl alcohol were reacted at 130° C. for 2 hours so that a uniform solution formed. 2.22 g (15.0 mmol) of phthalic anhydride were added to this. The mixture was stirred at 130° C. for a further hour, until the phthalic anhydride had dissolved. The resulting solution was cooled to room temperature, and 400 cm³ (3.6 mol) of titanium tetrachloride kept at −20° C. were added dropwise in the course of 1 hour, after which the mixture was heated to 110° C. for 4 hours. When the temperature of 110° C. was reached, 5.36 cm³ (25.0 mmol) of diisobutyl phthalate were added. The mixture was stirred at this temperature for a further 2 hours. It was then filtered hot in order to obtain the solid content, which was suspended in 400 cm³ of titanium tetrachloride again and reacted at 110° C. for 2 hours. The solid content was then collected by hot filtration and washed with hot decane and hexane at 110° C., until free titanium compound was no longer to be detected in the wash solvents. The solid titanium catalyst component thus obtained was stored in the form of a suspension in hexane. A portion of the suspension was dried to analyze the composition of the catalyst. The analysis showed 2.5% by weight of titanium, 56.4% by weight of chlorine, 17.5% by weight of magnesium and 21.0% by weight of diisobutyl phthalate.

Polymerization $H_2$ was initially introduced into a kettle of 70 dm³ capacity up to an internal pressure of 1.5 bar, 40 dm³ of liquid propylene were introduced and 200 mmol of triethylaluminum, 40 mmol of diphenyldimethoxysilane and 4.53 cm$^3$ of the contact suspension described above (corresponding to 0.08 mmol of Ti) were metered in successively. The contents of the kettle were now heated up to 70° C. and the polymerization of the propylene was carried out for 80 minutes. After the internal temperature had been reduced to 60° C. in the course of 10 minutes, ethylene was passed in and the internal pressure was brought to 32 bar. This pressure was maintained throughout the remaining 50 minutes of reaction time by topping up with ethylene. 0.75 kg of block copolymer was obtained. The polymer had a VN of 138. 5.7% by weight of the polymer was formed by polymerization of ethylene. 94% of crystallizable contents, based on the total polymer, having an ethylene content of 3.0% by weight and a VN of 139 was obtained by recrystallization from the gasoline mixture. 6%, based on the block copolymer, of a rubbery composition having an ethylene content of 47% by weight and a VN of 79 was obtained from the mother liquor by precipitation with acetone. In the enthalpy curve obtained from the differential thermal analysis ($-180$ to 200° C., heating rate 2 K/minute), a glass transition was to be observed below the temperature zero point in the temperature range from $-56$ to $-25°$ C. The polymer had a melt flow index 230/2.16 of 230 g/10 minutes, a notched impact strength at $-40°$ C. of 0.9 mJ/mm$^2$ and a notched impact strength at $-60°$ C. of 0.6 mJ/mm$^2$.

We claim:

1. A process for the preparation of a polypropylene molding composition consisting essentially (1) 20 to 99% bv weight of a crystalline polymer which is comprised to the extent of at least 95% by weight of polymerized propylene and (2) 1 to 80% by weight of a non-crystalline ethylene-propylene copolymer having an ethylene content of 20 to 90% by weight, in which first the polymer (1) is prepared in one or more stages in liquid propylene over a residence time of 15 to 400 minutes under a pressure of 5 to 100 bar and at a temperature of 0 to 100° C., and the polymer (2) is prepared in a second stage over a residence time of 10 to 180 minutes, under a pressure of 5 to 100 bar and at a temperature of 0 to 100° C. in the presence of ethylene in the gas phase, in the presence of a catalyst which is comprised of a transition metal compound and an organoaluminum compound, which comprises carrying out the polymerization in the second stage in the gas phase, and using a transition metal compound which is a metallocene of the formula I

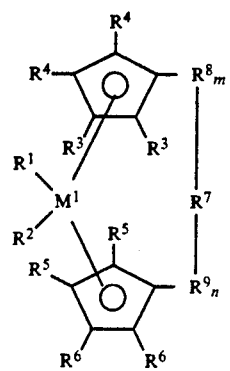

in which

M$^1$ is a metal of group IVb, Vb or VIb of the periodic table,

R$^1$ and R$^2$ are identical or different and are a hydrogen atom, a C$_1$-C$_{10}$-alkyl group, a C$_1$-C$_{10}$-alkoxy group, a C$_6$-C$_{10}$-aryl group, a C$_6$-C$_{10}$-aryloxy group, a C$_2$-C$_{10}$-alkenyl group, a C$_7$-C$_{40}$-arylalkyl group, a C$_7$-C$_{10}$-alkylaryl group, a C$_8$-C$_{40}$-arylalkenyl group or a halogen atom, R$^3$, R$^4$, R$^5$ and R$^6$ are identical or different and are a hydrogen atom, a halogen atom, a C$_1$-C$_{10}$-alkyl group, $-$NR$^{10}$, $-$SR$^{10}$, $-$OSiR$_3^{10}$, $-$SiR$_3^{10}$ or PR$_2^{10}$, in which R$^{10}$ is a halogen atom or a C$_1$-C$_{10}$-alkyl group, or in each case two adjacent R$^3$, R$^4$, R$^5$ or R$^6$ form a ring with the carbon atoms joining them, R$^7$ is

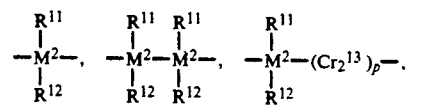

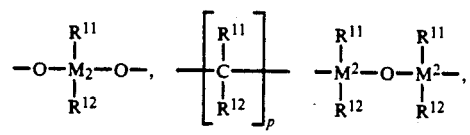

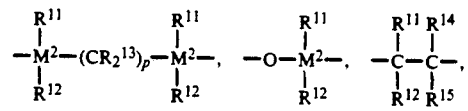

=Br$^{11}$, =AlR$^{11}$, $-$Ge$-$, $-$Sn$-$, $-$O$-$, $-$S$-$,

=S=O, =SO$_2$, =NR$^{11}$, =CO, =PR$^{11}$ or

=P(O)R$^{11}$,

R$^{11}$, R$^{12}$, R$^{13}$, R$^{14}$ and R$^{15}$ are identical or different and are a hydrogen atom, a halogen atom, a C$_1$-C$_{10}$-alkyl group, a C$_1$-C$_{10}$-fluoroalkyl group, a C$_6$-C$_{10}$-aryl group, a C$_6$-C$_{10}$-fluoroaryl group, a C$_1$-C$_{10}$-alkoxy group, a C$_2$-C$_{10}$-alkenyl group, a C$_7$-C$_{40}$-arylalkyl group, a C$_8$-C$_{40}$-arylalkenyl group or a C$_7$-C$_{40}$-alkylaryl group, or R$^{11}$ and R$^{12}$ or R$^{11}$ and R$^{13}$ form a ring, in each case with the atoms joining them, M$^2$ is silicon, germanium or tin, p is 1, 2 or 3, R$^8$ and R$^9$ are identical or different and are a group =CR$^{11}$R$^{12}$, in which R$^{11}$ and R$^{12}$ have the above-mentioned meaning, and m and n are identical or different and are zero, 1 or 2, m+n being zero, 1 or 2, and an organoaluminum compound which is an aluminoxane of the formula II

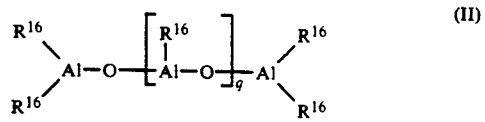

for the linear type and/or of the formula III

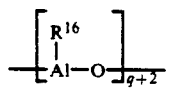
(III)

for the cyclic type, in which $R^{16}$ is a $C_1$–$C_6$-alkyl group and q is an integer from 2 to 50.

2. The process as claimed in claim 1, wherein up to 5 mol % of a 1-olefin having 4 to 10 carbon atoms is additionally employed in the preparation of the polymers (1) and (2).

3. The process as claimed in claim 1, wherein the monomer of the first stage is removed before the beyond stage is carried out.

4. The process as claimed in claim 1, wherein at least an amount of ethylene is passed into the suspension containing the polymer (1) such that the monomer mixture leaves the liquid state of aggregation and passes into a supercritical state.

5. The process of claim 1 wherein $M^1$ is selected from the group consisting of titanium, zirconium, hafnium, vanadium, niobium, tantalum, chromium, molybdenum and tungsten.

6. The process of claim 8 wherein $M^1$ is zirconium or hafnium.

7. The process of claim 1 wherein $R^1$ and $R^2$ are selected form the group consisting of a $C_1$–$C_3$-alkyl group, a $C_1$–$C_3$-alkoxy group, a $C_6$–$C_8$-aryl group, a $C_6$–$C_8$-aryloxy group, a $C_2$–$C_4$-alkenyl gruop, a $C_7$–$C_{10}$-arylalkyl group, a $C_7$–$C_{12}$-alkylaryl group, a $C_8$–$C_{12}$-aryalkenyl group and chlorine.

8. The process of claim 1 wherein $R^3$, $R^4$, $R^5$ and $R^6$ are selected from the group consisting of hydrogen, fluorine, chlorine, bromine, a $C_1$–$C_3$-alkyl group, a —$NCl_2$, —$SCl$, $OSiCl_3$, —$SiCl_3$ and $PCl_2$.

9. The process of claim 1 wherein $R^{11}$,$R^{12}$,$R^{13}$,$R^{14}$ and $R^{15}$ are selected from the group consisting of a $C_1$–$C_4$-alkyl group, a $CF_3$ group, a $C_6$–$C_8$-aryl group, a pentafluorophenyl group, a $C_1$–$C_4$-alkoxy group, a $C_2$–$C_4$-alkenyl group, a $C_7$–$C_{10}$-arylalkyl group, a $C_8$–$C_{12}$-aryalkenyl group and a $C_7$–$C_{12}$-alkylaryl group.

10. The process of claim 1 wherein m and n are zero of 1.

11. The process of claim 1 wherein the metallocene is selected from the group consisting of: rac-ethylenebisindenylhafnium dichloride, rac-dimethylsilylbisindenylhafnium dichloride, rac-phenyl(methyl)silylbisindenylhafnium dichloride and rac-dimethyl silylbisindenylzirconium dichloride.

12. The process of claim 1 wherein $R^{16}$ is selected from the group consisting of methyl, ethyl and isobutyl.

13. The process of claim 1 wherein q is an integer from 10 to 40.

14. The process of claim 1 further comprsiing preactivating the metallocene with the aluminoxane prior to the polymerization.

15. The process of claim 1 wherein the reaction in the first stage is carried out at a temperature of 40 to 85° C. and a pressure of 5 to 60 bar.

16. The process of claim 1 wherein in the second polymerization stage the pressure is 5 to 49 bar and the temperature is 40 to 85° C.

17. The process of claim 1 wherein the amount of polymer (1) prepared in the first stage is 40 to 95% by weight.

18. The process of claim 17 wherein the amount of polymer (1) prepared in the first stage is 60 to 95% by weight.

* * * * *